United States Patent
Gardner et al.

[19]

[11] Patent Number: 6,058,289
[45] Date of Patent: *May 2, 2000

[54] METHOD AND APPARATUS FOR LOW POWER MOBILE UNIT FOR CELLULAR COMMUNICATIONS SYSTEM

[75] Inventors: Steven Holmsen Gardner, San Diego; Carl Thomas Hardin; James E. Petranovich, both of Encinitas, all of Calif.

[73] Assignee: Pacific Communication Sciences, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/533,682

[22] Filed: Sep. 26, 1995

[51] Int. Cl.⁷ .............................. H04Q 7/08; H04Q 7/10; H04Q 7/12
[52] U.S. Cl. .................. 455/31.3; 455/31.2; 455/38.3; 455/515; 455/574; 455/572; 340/825.44; 340/825.47; 370/311; 370/459
[58] Field of Search .................................. 379/59, 60, 58; 370/95.3, 95.1, 311, 459; 455/33.1, 54.1, 33.2, 432, 434, 436, 437, 438, 439, 574, 572, 31.2, 31.3, 38.3, 515, 550, 426; 340/825.44, 825.47

[56] References Cited

U.S. PATENT DOCUMENTS

| | | | |
|---|---|---|---|
| 5,150,361 | 9/1992 | Wieczorek et al. | 370/95.1 |
| 5,179,559 | 1/1993 | Crisler et al. | 455/436 |
| 5,396,496 | 3/1995 | Ito et al. | 379/58 |
| 5,448,569 | 9/1995 | Huang et al. | 455/439 |
| 5,483,669 | 1/1996 | Barnett et al. | 455/437 |
| 5,491,837 | 2/1996 | Haartsen | 455/62 |
| 5,499,386 | 3/1996 | Karlsson | 455/33.2 |
| 5,499,387 | 3/1996 | Chambert | 455/33.2 |
| 5,511,110 | 4/1996 | Drucker | 370/95.1 |
| 5,539,748 | 7/1996 | Raith | 370/95.1 |
| 5,566,357 | 10/1996 | Holcman | 455/54.1 |
| 5,568,654 | 10/1996 | Fukawa | 455/33.1 |
| 5,590,396 | 12/1996 | Henry | 455/574 |
| 5,594,776 | 1/1997 | Dent | 379/58 |
| 5,594,951 | 1/1997 | Bellin | 455/574 |
| 5,603,081 | 2/1997 | Raith et al. | 455/33.1 |
| 5,604,744 | 2/1997 | Andersson et al. | 370/95.1 |
| 5,634,192 | 5/1997 | Mech et al. | 455/437 |

*Primary Examiner*—Wellington Chin
*Assistant Examiner*—Keith Ferguson
*Attorney, Agent, or Firm*—Blakely, Sokoloff, Taylor & Zafman; Steven Shaw; Bruce Greenhaus

[57] ABSTRACT

A method and apparatus for efficient use of both power and bandwidth in a cellular communications system in which a Mobile Unit preferably enters Sleep-Mode when no communications have occurred between the Mobile Unit and the Base Station over a predetermined amount of time measured by an "Idle Timer". Upon expiry of a Wake Timer, the Mobile Unit awakes from Sleep-Mode to determine whether a message is pending. Concurrently, the Base Station transmits a "TEI-Notification" message directed to all Mobile Units to notify each Mobile Unit that has data pending. A system parameter determines the intervals at which the Base Station will transmit these notifications. Upon waking to receive a TEI-Notification message, the Mobile Unit determines whether the quality of the transmission is at least sufficient to allow the Mobile Unit to decipher the TEI-Notification message. If this minimal requirement is met, and the TEI-Notification message does not indicate that data is pending for the Mobile Unit, the Mobile Unit returns to sleep, even though the Mobile Unit may reside in a cell other than the cell associated with the Base Station currently assigned by the IS to communicate with the Mobile Unit. The Mobile Unit of the present invention does not monitor the forward channels on a regular basis, but rather waits until either the signal quality of the forward channel over which the Mobile Unit is receiving has degraded such that the TEI-Notification message can no longer be deciphered, or the TEI-Notification message indicates that a message is pending.

18 Claims, 5 Drawing Sheets

METHOD AND APPARATUS FOR LOW POWER MOBILE UNIT FOR CELLULAR COMMUNICATIONS SYSTEM

BACKGROUND OF THE INVENTION

1. Field of the Invention

This invention relates to communications equipment, and more particularly to a method and apparatus for reducing the power consumption and increasing the frequency efficiency of a mobile communications unit used in a cellular communications network.

2. Description of Related Art

It has long been a goal of communications engineers to establish a mobile communication network that would allow an individual to maintain wireless communications with others. That goal is being realized today by a mobile cellular communication system, commonly referred to as Advanced Mobile Phone Service (AMPS), in which an area is geographically divided into cells. In addition to AMPS, a Cellular Digital Packet Data (CDPD) system has been implemented to allow wireless communication of digital data. A typical cell in a cellular system may be sectored or omni-directional. In a sectored cell, the coverage may be divided among several antennae that serve different regions of the cell. Typically, three to six sectors are used within a sectored cell. A Base Station associated with each cell sector controls airlink access to Mobile Units (which are typically mobile/cellular phones).

FIG. 1 illustrates a number of sectored cells 102 arranged to cover a relatively large geographic area. FIG. 2 illustrates a single sectored cell 102. Each cell 102 typically has three sectors 103, each of which is serviced by a corresponding one Base Station 101a, 101b, 101c having an independent antenna. Each sector 103 has a "footprint" 105 (i.e., an area that is within the range of the Base Station 101 for both transmit and receive signals), which may differ in size and shape from sector to sector. In accordance with one implementation of a cellular communications system, cell boundaries are preferably defined as a set of connected points, each of which have equal received power as observed at a Mobile Unit 109. The broken line 105 shown in FIG. 2 represents footprint boundaries. Typically, a number of cells 102 are arranged in proximity to one another, such that the sectors 103 of adjacent cells 102 overlap. Generally, such overlapping of sectors 103 of adjacent cells 102 ensures that a Mobile Unit 109 may maintain contact with at least one Base Station 101 from any location.

A Mobile Data Intermediate System (MDIS) 112 must know which Mobile Units 109 are within each cell so that communications to the Mobile Unit 109 may be properly routed. In addition, the Mobile Unit 109 must know on which forward and reverse channel to receive and transmit. In accordance with one cellular system, the particular forward and reverse channels on which the Mobile Unit 109 is to receive and transmit depend upon the relative signal quality of the signals received by the Mobile Unit 109 over the available forward channels. If the Mobile Unit 109 leaves a cell and attempts to transmit on the forward channel associated with that cell, there is an increased chance that the transmission will interfere with the transmissions of other Mobile Units 109 attempting to communicate with other Base Stations on the same reverse channel. This is likely because the same frequencies are allocated to more than one Base Station, as shown in FIG. 3. These Base Stations are separated by a distance which is sufficient to prevent interference with one another as long as each Mobile Unit 109 transmits that frequency only while within the boundaries of that cell.

As the Mobile Unit 109 moves away from the Base Station to which it is transmitting and from which it is receiving, the quality of the signal it receives will generally decrease. Concurrently, the quality of the signal present on the forward channel of the neighboring Base Station toward which the Mobile Unit 109 is approaching will generally improve. In accordance with the CDPD system, when the signal quality of the neighbor Base Station becomes greater than the signal quality of the selected Base Station, the mobile Unit 109 assumes that it has entered a new cell. At that point, the Mobile Unit 109 executes a cell transfer to the Base Station within the neighbor cell.

The need to transmit a message informing the MDIS 112 that the cell transfer has been executed and to monitor signal quality to determine when to request a cell transfer is typically not problematic when the Mobile Unit 109 consumes a relatively large amount of power during normal operation. For example, cellular telephones are required to transmit frequently and/or for relatively long periods of time. Therefore, the amount of power consumed by monitoring and transmitting cell transfer requests is not typically a significant portion of the power drain on the battery. However, other types of Mobile Units 109 are expected to consume less power and have longer battery life. For example, pagers typically are expected to have a battery life that extends for as much as one month or more. Repeatedly monitoring the forward channels and transmitting a message informing the MDIS 112 that a cell transfer has occurred each time a cell boundary is crossed requires a substantial amount of power. That is, monitoring each forward channel requires the Mobile Unit 109 to first receive each forward channel for a period of time. The signal quality of each channel must then be compared to determine which forward channel has the best signal quality. In systems which have the ability to limit power consumption by entering a dormant state or "sleep-mode", such monitoring requires the Mobile Unit 109 to awake in order to perform the monitoring function. Transmitting a cell transfer message is typically performed far less frequently than monitoring, but requires a relatively large amount of power.

Therefore, because of the power requirements associated with a cellular system (i.e., the need to monitor forward channels and perform cell transfers) and the desire to provide pagers with extended battery life, service providers are not currently using cellular communication techniques in paging systems. Rather, paging is typically performed today by broadcasting a page through each of the Base Stations within a geographic area using the same transmission frequency at each Base Station, eliminating the need for monitoring forward channels and performing cell transfers. This broadcast is commonly referred to as a "simulcast". The geographic area is determined by the nature of the service for which the client has subscribed. For example, when a paging service client orders paging service from a particular service provider, the client orders that service for a particular geographic service area, such as Southern California. Pages for that client are then transmitted on every Base Station in the geographic service area in which the client has paid for service.

Each client is provided with a mobile receiver and assigned a unique client number. The client number allows each client to be uniquely identified, and thus contacted. In a simulcast system, when a page for that client is received by the service provider, the service provider does not know where that client's mobile receiver will be. Accordingly, the client is paged by simulcasting a signal through each of the Base Stations in the entire service area. The signal that is transmitted indicates that there is a message pending for that client by transmitting the unique client number. In many paging systems in use today, pagers topically need only receive messages. However, some systems in use today for paging send an acknowledgment from the pager upon receipt of a message.

Paging systems may also reduce the power requirements of the Mobile Unit 109 by having each Base Station transmits a complete list of the client numbers for those clients for whom a page is pending on a regular basis. If the client's pager device does not see its client number in the list, it can revert to sleep mode until the next list is due to arrive. If the pager detects its client number, then the pager continues to receive transmissions from the Base Station in an attempt to receive the message intended for that client. After the message intended for that client is received, the Mobile Unit 109 ceases monitoring the forward channel except at regular intervals during which the list of clients is again transmitted. Due to the relatively limited bandwidth assigned to each service provider (typically 50 kHz), the use of such a simulcast paging scheme limits the number of clients that can be effectively serviced without extensive delays in the time required to contact the client. It can be seen that far greater capacity and lower delays are possible in a cellular communication system, since in a cellular communication system forward transmission to a Mobile Unit 109 is routed through only that particular Base Station associated with the Mobile Unit 109. However, these advantages are currently being sacrificed in order to reduce the power requirements of the Mobile Unit 109.

Accordingly, it would be desirable to provide a cellular communication system in which the power requirements of the Mobile Unit arc reduced so that the advantages of cellular communications may be realized without having to sacrifice bandwidth and/or battery life. It would also be desirable to provide a method and apparatus which allows more efficient use of available bandwidth in a paging scheme, but which does not need to transmit frequently for control and system maintenance, and thus uses power relatively efficiently.

SUMMARY OF THE INVENTION

The present invention is a method and apparatus for efficient use of both power and bandwidth in a cellular communications system. In accordance with one embodiment of the present invention, a Mobile Unit includes a receiver, a transmitter, and processor which controls operation of the receiver and the transmitter. The Mobile Unit communicates with a Base Station over an airlink. A plurality of Base Stations are each coupled to an Intermediate System (IS). The IS is responsible for routing messages between a Mobile Unit and devices connected to other networks, such as the conventional public switched telephone network (PSTN), public data networks and/or private data networks.

Each Mobile Unit typically establishes an airlink with only one Base Station at a time. A cell transfer occur when the Mobile Unit desire to establish an airlink with a different Base Station. Each Base Station is responsible for establishing an airlink to a number of Mobile Units within a particular area (i.e., a "cell"). The airlink completes a communication link between an IS and each Mobile Unit. Each Mobile Unit may move freely into and out of a cell. In accordance with one embodiment of the present invention, a radio resource management entity (RRME) implemented by the processor within the Mobile Unit is responsible for ensuring that the Mobile Unit is linked to the most appropriate Base Station. That is, as the Mobile Unit moves from cell to cell, the RRME is responsible for ensuring that the Mobile Unit is in contact with the most appropriate Base Station. One way in which the RRME determines which Base Station is most appropriate is to measure one or more forward link characteristics, such as "Received Signal Strength Indication" (RSSI) or "Bit Error Rate" (BER). The Base Station which is transmitting the forward channel having the best signal quality is then selected. In accordance with the present invention, upon initial application of power to the Mobile Unit, the Mobile Unit preferably establishes an airlink with a Base Station having the best forward channel signal characteristics. Upon establishing the airlink, the Mobile Unit is assigned a Temporary Equipment Identification (TEI) number which is used to identify that particular Mobile Unit until the Mobile Unit requests a new TEI or the IS determines that the Mobile Unit has left the network, which may be determined by a message sent by the Mobile Unit prior to exit or by a time-out triggered by a lack of activity from the Mobile Unit. The IS maintains a log that indicates to which Base Station each Mobile Unit has established an airlink.

In order to conserve power, the Mobile Unit in accordance with the present invention includes a "Sleep-Mode". In Sleep-Mode, the Mobile Unit deactivates essentially all of the functions, except for a "Wake Timer" which "awakes" the Mobile Unit from Sleep-Mode at regular intervals. This includes deactivation of receive and transmit processing. Thus, during Sleep-Mode the amount of power expended by the Mobile Unit is significantly reduced. A Mobile Unit preferably enters Sleep-Mode when no communications have occurred between the Mobile Unit and the Base Station over a predetermined amount of time measured by an "Idle Timer". In the preferred embodiment of the present invention, both the Mobile Unit and the IS have Idle Timers that run independently. These Idle Timers are reset when a communication occurs from the Mobile Unit to the IS. Each time the Wake Timer expires, the Mobile Unit awakes to receive a Temporary Equipment Identification (TEI) message (referred to as a "TEI-Notification" message) on the forward channel. Concurrently, the TEI-Notification message is sent over the forward channel from the Base Station. The TEI-Notification message preferably contains a list of all TEIs associated with Mobile Units that have messages pending for them. In accordance with the preferred embodiment of the present invention, each Mobile Unit registered on the network is associated with a unique TEI which identifies communications intended for that Mobile Unit. The Mobile Unit enters Sleep-Mode upon expiry of the Idle Timer within the Mobile Unit, and the IS assumes the Mobile Unit to be in Sleep-Mode upon expiry of the Idle Timer within the IS.

A Notification Timer within the IS indicates approximately when the Base Station is to transmit the TEI-Notification message. Accordingly, the Notification Timer within the IS and the Wake Timer within each Mobile Unit should be coordinated. This coordination preferably occurs when the Mobile Unit initially establishes communications and synchronization with a Base Station. A system parameter determines the intervals at which the Base Station will transmit these notifications and thus the timer values for the Wake Timer and the Notification Timer within the IS. Once the Mobile Unit enters Sleep-Mode, the Mobile Unit only receives transmissions upon expiry of the Wake Timer. Upon waking to receive a TEI-Notification message, the Mobile Unit determines whether the quality of the transmission is at least sufficient to allow the Mobile Unit to decipher the TEI-Notification message. If this minimal requirement is met, and the TEI-Notification message does not indicate that data is pending for the Mobile Unit, the Mobile Unit returns to sleep, even though the Mobile Unit may reside in a cell other than the cell associated with the Base Station through which the Mobile Unit is currently communicating with the network. By maintaining the airlink between the Base Station and the Mobile Unit even after the Mobile Unit has left the cell associated with the Base Station maintaining the airlink, the Mobile Unit need not select a new Base Station, and thus need not transmit a message to tell the IS that another Base Station has been selected. Therefore, the power requirements of the Mobile Unit are substantially reduced. Once the RRME within the Mobile Unit determines that the Mobile Unit can no longer accurately receive the forward transmission from the Base Station due to degradation of the forward channel signal quality, the Mobile Unit will cause an essentially conventional cell transfer to occur. That is, the Mobile Unit preferably determines which forward channel has the best characteristics and sends a message to the IS via the newly selected Base Station. The IS then ensures that future messages to the Mobile Unit are routed through the new Base Station.

The Mobile Unit of the present invention does not monitor the forward channels on a regular basis, but rather waits until either the signal quality of the forward channel over which the Mobile Unit is receiving has degraded such that the TEI-Notification message can no longer be reliably deciphered, or the TEI-Notification message indicates that a message is pending. Therefore, the Mobile Unit need only awake for relatively short periods of time to receive the TEI-Notification message, even if the Mobile Unit leaves a cell. This saves considerable power, since the Mobile Unit will be "awake" for less time and have less processing to accomplish. Furthermore, the number of cell transfers is substantially reduced because the present invention preferably maintains contact with the same Base Station until either a page is pending for that Mobile Unit or the transmissions of the TEI-Notification message can no longer be deciphered.

Since people typically remain within a relatively limited geographic area, the number of times a Mobile Unit must monitor all forward channels or transmit a cell transfer message is substantially reduced. For example, a Mobile Unit that is used near the boundary between two cells may encounter conditions where the best server Base Station changes many times during the course of a day or even over a period of a few minutes. Also, changing the position of a mobile unit by a few feet can alter the relative signal strength of a particular forward channel by 20 dB or more, so that near the boundary of a cell, a person carrying a Mobile Unit can change the preferred server Base Station by simply shifting the position of his chair. In accordance with prior art systems, the Mobile Unit may have to execute a cell transfer each time such a movement happens, consuming substantial battery power in the Mobile Unit and also needlessly using airlink capacity to transmit overhead messages used by the IS for routing purpose. In accordance with the present invention, a Mobile Unit would attempt a cell transfer only if a message is sent to that Mobile Unit. Otherwise, the Mobile Unit continues to listen to the same Base Station.

The present invention provides an efficient method for managing communications between a Mobile Unit and an IS which allows a Mobile Unit to be contacted through a single Base Station and which is very power efficient with respect to the Mobile Unit. These advantages are particularly realized when the Mobile Unit is a mobile pager or other such device which is intended to receive and transmit relatively short burst messages relatively infrequently.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

The present invention is a method and apparatus for efficient use of both power and bandwidth in a cellular communications system and is particularly useful with narrowband personal communications systems (PCS) such as paging systems. The following two Copending U.S. Patent Applications are herein incorporated by reference, each being assigned to the Assignee of the present application: "Method and Apparatus for Controlling Wireless Subscriber Stations Subject to Power Consumption Constraints in Mobile Packet Data Communication System" and "Time Sharing Method and Apparatus for Frequency reuse in Cellular Communication Systems".

Figure 1:
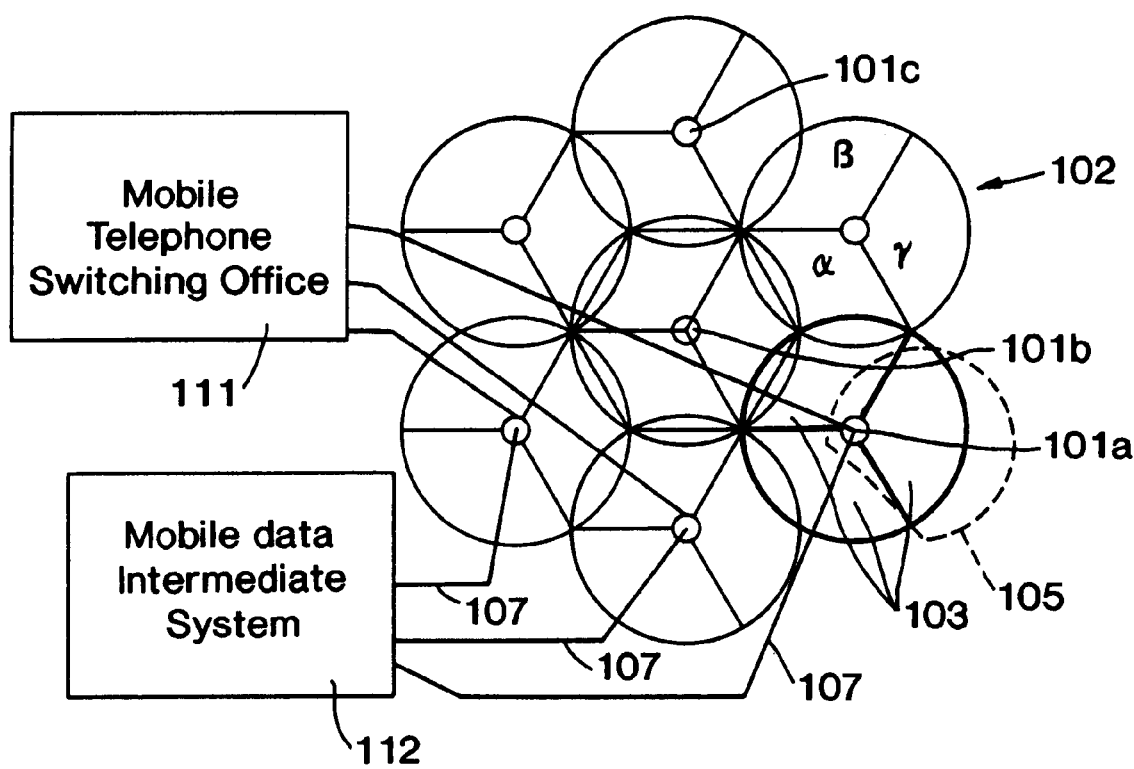
FIG. 1 illustrates a number of sectored cells arranged to cover a relatively large geographic area.
Figure 2:
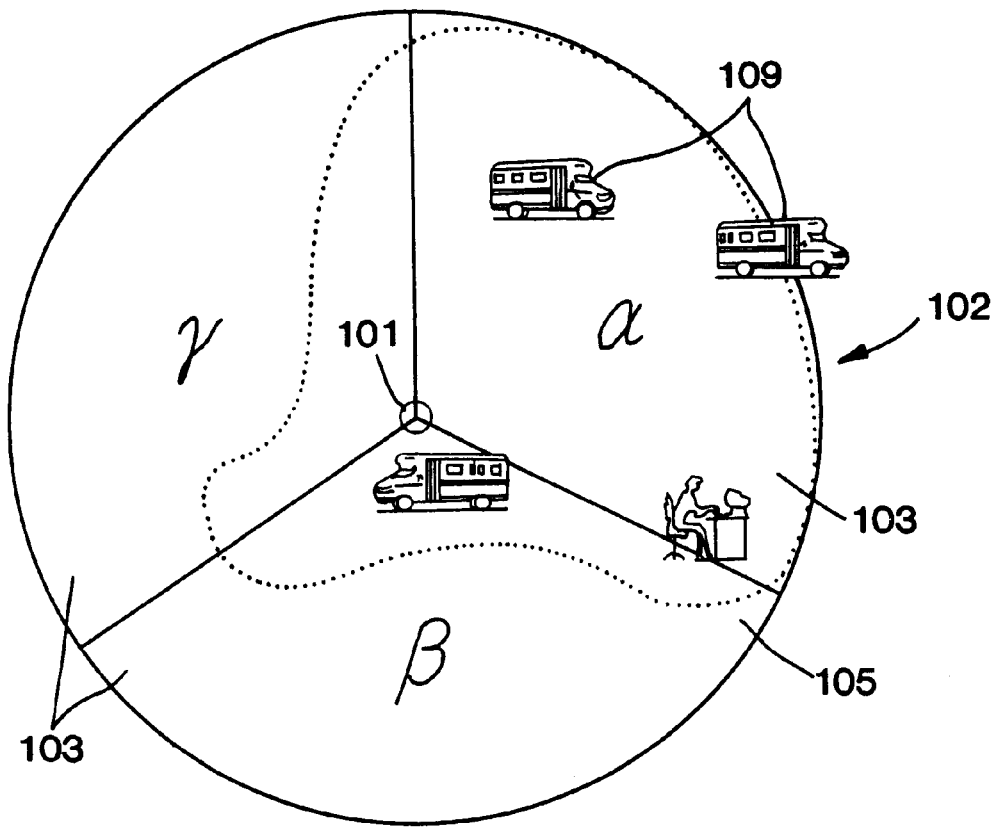
FIG. 2 illustrates a single sectored cell.
Figure 3:
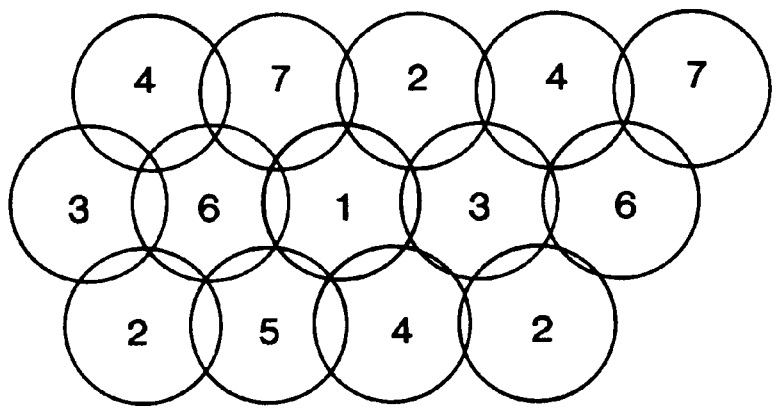
FIG. 3 illustrates how frequencies may be allocated to cells.
Figure 4:
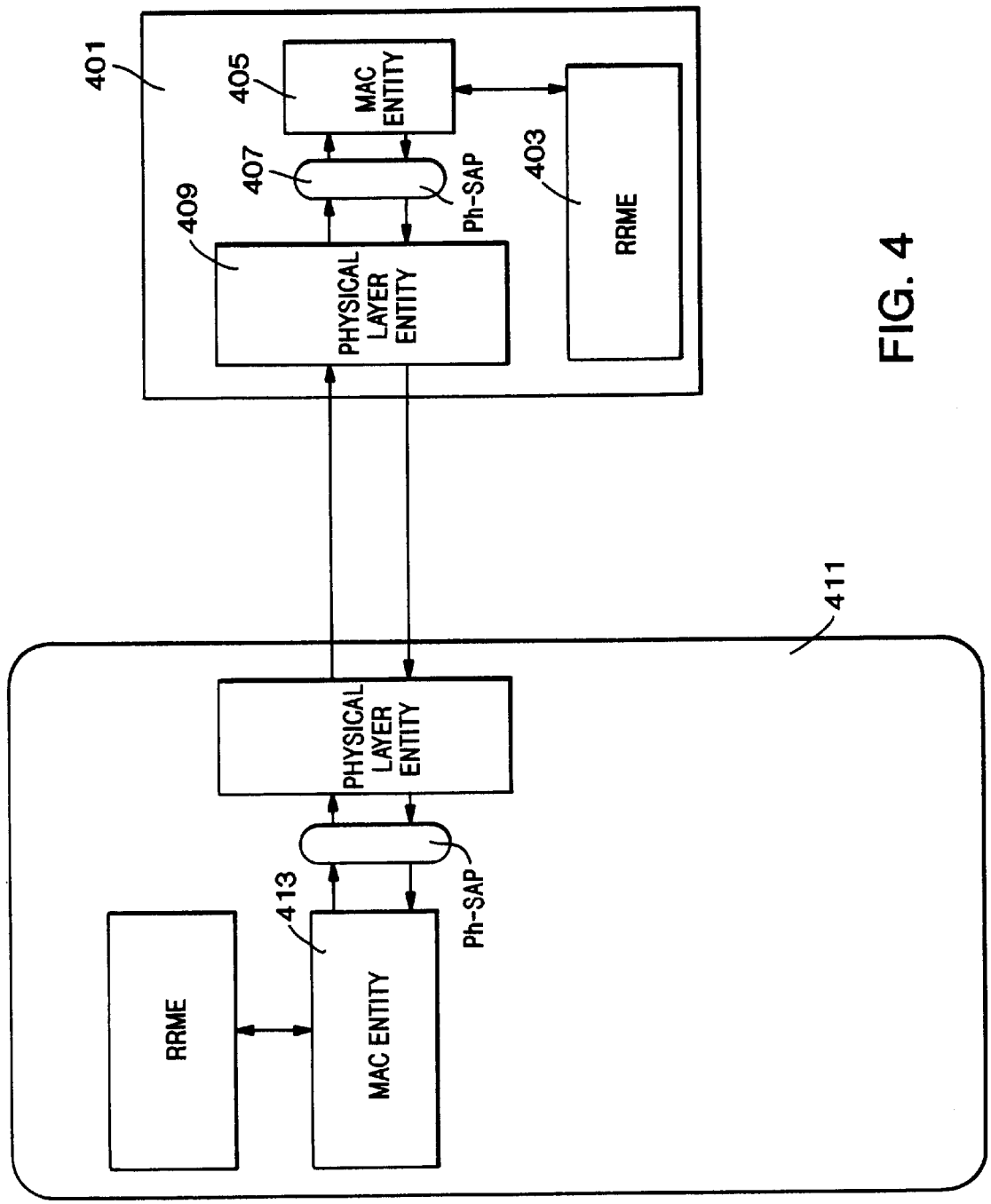
FIG. 4 is a logical block diagram of a Mobile Unit in accordance with one embodiment of the present invention.

FIG. 4 is a logical block diagram of a Mobile Unit 401 Communicating with a Base Station 411 in accordance with one embodiment of the present invention. The Mobile Unit 401 of the present invention has extended battery life and efficiently uses available bandwidth because the present invention scans the available forward channels in an attempt to perform a cell transfer only if: (1) the signal quality of the forward channel which the Mobile Unit 401 is attempting to receive is so poor that the Mobile Unit 401 is unable to decode the TEI-Notification message, or (2) the TEI-Notification message includes the TEI of that Mobile Unit 401. In accordance with one embodiment of the present invention, the Mobile Unit 401 always attempts to find the best forward channel upon detecting the TEI associated with that Mobile Unit 401. However, in an alternative embodiment, additional or alternative criteria (such as signal quality, amount of time since the last scan for a better channel, etc.) may be used to determine whether to scan for a better forward channel.

Base Station

In accordance with the present invention, Base Stations 411 within a cellular system are used to route messages to a particular Mobile Unit 401. As in any conventional cellular communications system, the particular Base Station 411 which is to route a message to a Mobile Unit 401 depends upon the geographic location of the Mobile Unit. In accordance with the present invention, when a Mobile Unit 401 initially begins operating, the Mobile Unit 401 scans the available forward channels and establishes an airlink to that Base Station 411 which is transmitting the highest quality forward channel. Upon selecting the best serving Base Station 411, the Mobil Unit 401 first executes a physical layer acquisition in which the Mobile Unit 401 synchronizes to the forward channel and begins to extract channel status flags and message data blocks from the physical layer. The Mobile Unit 401 then executes a Data Link Establishment procedure in which it establishes a registration with an Intermediate System (IS). In accordance with the present invention, during the Data link Establishment Procedure, the Mobile Unit 401 of the present invention may request "Sleep-Mode". In general, Sleep-Mode permits the Mobile Unit 401 to disable or powerdown its receiver, transmitter, and associated circuitry. During Data Link Establishment, the Mobile Unit 401 is assigned a Temporary Equipment Identification (TEI) number which both the Mobile Unit 401 and the cellular communication network will use to identify that Mobile Unit 401. The Base Station 411 communicates with the IS which causes messages intended for that Mobile Unit 401 to be routed through the Base Station 411 with which the Mobile Unit 401 has established the airlink. If no frames are exchanged between the Base Station and the Mobile Unit 401 over the airlink within a predetermined period of time, and Sleep-Mode has been requested by the Mobile Unit, then the Mobile Unit 401 enters Sleep-Mode. In accordance with the present invention, the IS maintains an "Idle" Timer T203 associated with each Mobile Unit that has established an airlink with that Base Station 411. The IS assumes that when the Idle Timer T203 expires the associated Mobile Unit 401 is in Sleep-Mode.

Figure 5:
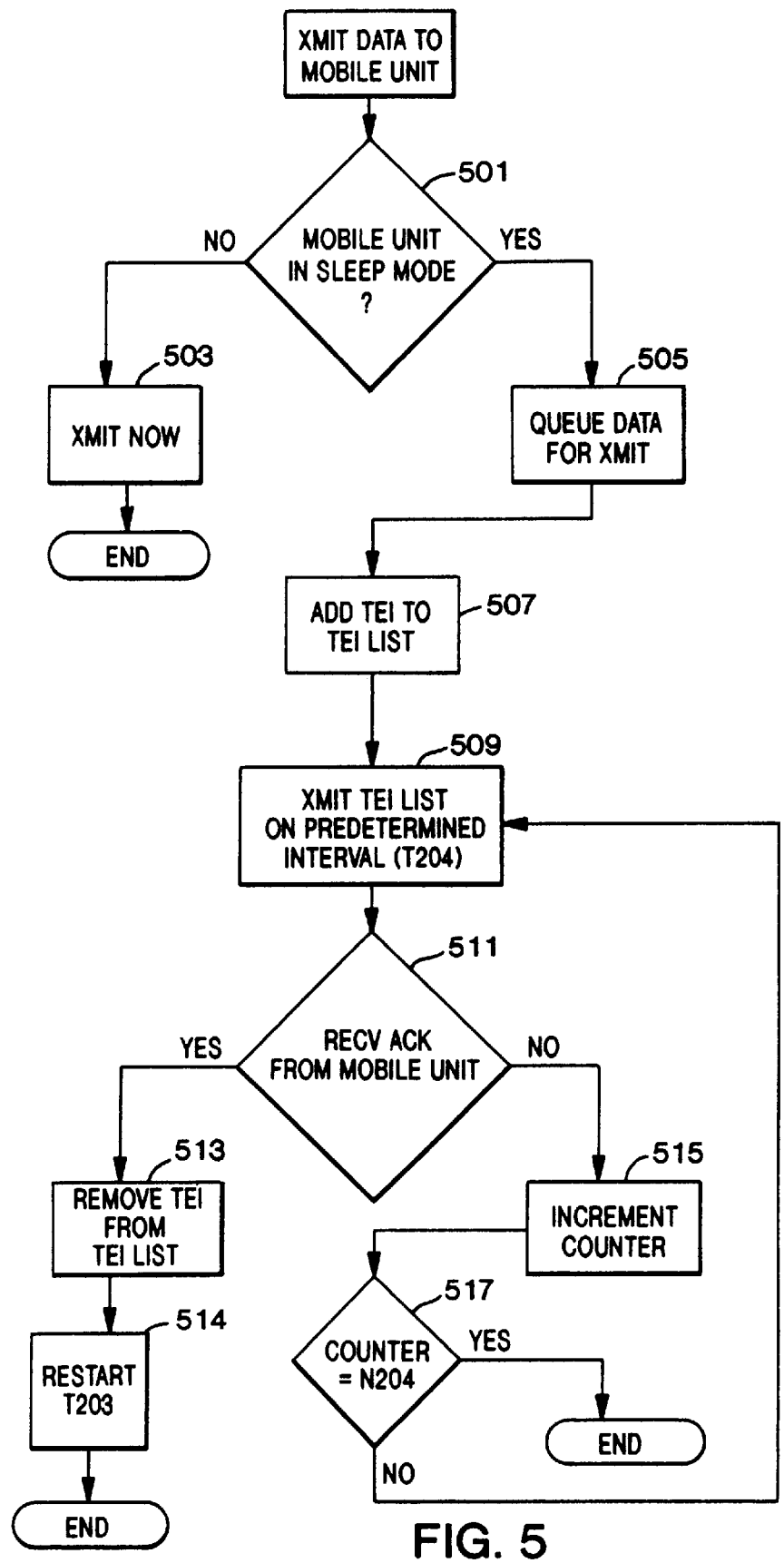
FIG. 5 is a high-level flowchart of the procedure followed by an Intermediate System in accordance with the present invention upon receiving data to be transmitted to a Mobile Unit Communicating with a Base Station.

FIG. 5 is a high-level flowchart of the procedure followed by a IS in accordance with the present invention upon receiving data from the network to be transmitted to a Mobile Unit 401. Initially, the IS determines whether the Mobile Unit 401 for which the data is pending is in Sleep-Mode (STEP 501). If not, then the pending data is queued for transmission to the Base Station 411 and then on to the Mobile Unit 401 in the next normal transmission. If the Mobile Unit 401 for which the data is pending is in Sleep-Mode, then the data is is considered to be "pending" (STEP 505) and the TEI of the Mobile Unit 401 for which the data is intended is added to the TEI-Notification list (STEP 507). The TEI-Notification list is transmitted to all the Mobile Units 401 in the cell at the predetermined interval (STEP 509). In accordance with one embodiment of the present invention, a MAC Entity 413 within the Base Station 411 inserts the TEI-Notification list into the forward channel at predetermined intervals counted in numbers of blocks of data. The predetermined number is preferably a system parameter. In accordance with an alternative embodiment of the present invention, the interval between transmissions of the TEI-Notification list is measured by time, rather than by a number of data blocks. In accordance with one embodiment of the present invention, information transmitted between the Base Station 411 and the Mobile Unit 401 is encoded using the well-known Reed-Solomon data encoding scheme. In such systems, a system parameter N210 defines an interval between transmissions of the TEI-Notification list measured in Reed-Solomon blocks. In accordance with one embodiment of the present invention, the preferred value of N210 is 512. Accordingly, a TEI-Notification message is transmitted from the Base Station 411 at intervals of 512 Reed-Solomon blocks.

In the preferred embodiment, the MAC Entity 413 ensures that no other messages are interrupted by the transmission of the TEI-Notification list by ensuring that a message boundary occurs at the time the TEI-Notification list is to be transmitted. Any message which would not have been completely transmitted by the time the TEI-Notification message is to be started is delayed. For example, if the TEI-Notification list is to be transmitted after the next three blocks of data have been transmitted, and a message which has four blocks of data is next to be transmitted, that message will be delayed. Any delayed messages are then transmitted after the TEI-Notification list. The TEI-Notification list is preferably delimited by known data patterns to allow receiving Mobile Units 401 to detect the beginning and end of the list. By ensuring that the TEI-Notification list starts at a known location within the forward channel, "sleeping" Mobile Units 401 will be able to awake just in time to receive the TEI-Notification message.

The IS then awaits a communication from each Mobile Unit 401 associated with the TEIs listed in the TEI-Notification list (STEP 511). If a Mobile Unit 401 associated with a listed TEI responds, then the TEI is removed from the TEI-Notification list (STEP 513). The T203 Timer is then restarted (STEP 514). Otherwise, a counter is incremented to indicate that the first attempt has been made (STEP 515) and the IS awaits the next TEI-Notification message interval (STEP 509). This process is repeated until the number of attempts counted is equal to a system parameter N204 that determines maximum number of attempts (STEP 517). If the Base Station is unable to notify the Mobile Unit 401 of pending data after a predetermined number of attempts, the pending data is discarded and the attempt to deliver the message is aborted. In accordance with the preferred embodiment of the present invention, the system parameter N204 is communicated from the IS through the Base Station 411 to the Mobile Unit 401 during the Data Link Establishment Procedure. In the preferred embodiment, the maximum number of attempts to be made by the Base Station 411 is set to the nearest integer value based on the following equation:

$$N204 = \text{Ceiling}[(N210 \times \text{ReedSolomonBlockDuration})/T204] \text{NetworkParameter}$$

Where:

NetworkParameter=5;

Ceiling(x)=the integer having the value x or next greater value from x if x is not an integer.

In one embodiment of the present invention, the preferred value for N204 is 16. Accordingly, the IS will make 16 attempts to notify a Mobile Unit 401 that there is data pending for that Mobile Unit 401.

Mobile Unit

The embodiment of the Mobile Unit 401 of the present invention shown in FIG. 4 is modeled on the abstractions defined in industry specification CCITT X.200. It will be understood by those skilled in the art that each of the blocks depicted in FIG. 4 are logical functions which may be implemented by a single device, such as a microprocessor, state machine, or dedicated circuitry, or which may be implemented by several discrete devices, each dedicated to one or more of these logical tasks.

The Mobile Unit 401 shown in FIG. 4 includes a Radio Resource Management Entity (RRME) 403, a Medium Access Control (MAC) Entity 405, a Physical Services Access Point (PhSAP) 407, and a Physical Layer Entity 409. The Physical Layer Entity 409 is a device which is capable of receiving and transmitting data over the airlink. For example, in accordance with one embodiment of the present invention, the Physical Layer Entity 409 is a modem having an Radio Frequency (RF) receiver and transmitter. The Physical Layer Entity 409 is driven by the MAC Entity 405. In accordance with one embodiment of the present invention, the MAC Entity 405 is a Digital Signal Processor (DSP) which implements a MAC layer protocol. At least a portion of the MAC Entity 405 is preferably implemented as an application specific integrated circuit (ASIC) which operates at relatively high speed in order to perform real-time functions necessary in controlling the Physical Layer Entity 409. In accordance with one embodiment of the present invention, the RRME 403 is a general purpose processor responsible for configuration and mangement of the Physical Layer Entity 409.

Interactions between the Physical Layer Entity 409 and the MAC Entity 405 preferably occur across the PhSAP 407. Accordingly, the PhSAP 407 controls the protocol between the Physical Layer Entity 409 and the MAC Entity 405. The Physical Layer Entity 409 is preferably capable of performing the following services: (1) tuning to a specified pair of RF channels for transmission and reception of bit between the Mobile Unit 401 and the Base Station 411; (2) transmitting and receiving bits between the Mobile Unit and the Base Station across the pair of RF channels; (3) setting the power level to be used for transmission of bits between the Mobile Unit 401 and the Base Station 411; (4) measuring the signal level of received bits at the Mobile Unit 401 and the Base Station 411; and (5) suspending and resuming monitoring of RF channels in the Mobile Unit in support of measures taken to conserve battery power.

Each of the entities 403, 405, 407, 409 within the Mobile Unit 401 operate essentially as is known in the prior art except for the following. In accordance with one embodiment of the present invention, Power primitives provide the RRME 403 with the ability to control the transmission power of the Mobile Unit 401. These Power primitives include: (1) Ph-QUALITY.indication which notifies the RRME 403 of the signal strength of the received waveform. In accordance with the preferred embodiment of the present invention, the Ph-QUALITY.indication primitive requests at least the parameter RSSI to be provided to the RRME 403. Additional signal strength and quality parameters may also be communicated to the RRME 403 together with RSSI. In an alternative embodiment, parameters other than RSSI are provided; and (2) Ph-SLEEP.request which allows the RRME 403 to instruct the Physical Layer Entity 409 to enter Sleep-Mode. In accordance with the preferred embodiment of the present invention, there are no additional parameters associated with the Ph-Sleep.request primitive.

The Mobile Unit 401 maintains an Idle Timer T203 similar to the Idle Timer T203 provided in the IS. The Idle Timer T203 expires at the end of the predetermined time to indicate that the Mobile Unit should enter Sleep-Mode. Each time a frame is transmitted by the Mobile Unit 401 over the airlink, the T203 Timer is reset.

Once in Sleep-Mode, the Mobile Unit 401 ceases monitoring the forward channel and does not transmit over the reverse channel. A second timer T204 represents the period at which the IS transmits notification of pending data for sleeping Mobile Units 401 in a TEI-Notification list via a TEI-Notification message. All Mobile Units 401 which use that channel stream must synchronize to the channel stream TEI-Notification update interval using the system parameter N210 which is updated and transmitted over the forward channel as part of each TEI-Notification message. In the preferred embodiment of the present invention. the T204 Timer is set to the nearest integer value in seconds based on the following equation:

$$T204=(N210 \times ReedSolomonBlockDuration)/3$$

In accordance with one embodiment of the present invention, the T204 system default is 8 seconds. In accordance with the present invention, the Mobile Unit 401 may use either the T204 Timer, or a counter which is decremented from the N210 value at a rate equal to the rate at which blocks of data are transmitted over the forward channel. The Mobile Unit preferably maintains a free-running clock that operates at a frequency that is a multiple of the forward channel bit rate. This clock is then used to determine the block boundaries and can be used to count the number of blocks that have occurred. This clock continues to run even when the Mobile Unit 401 is sleeping. Thus, the synchronization between the Mobile Unit 401 and the Base Station 411 is maintained between transmissions of the TEI-Notification message. Alternatively, the Mobile Unit and Base Station may be synchronized to a clock which defines the interval between transmissions of the TEI-Notification list in terms of time measured in fractions of a second.

Figure 6:
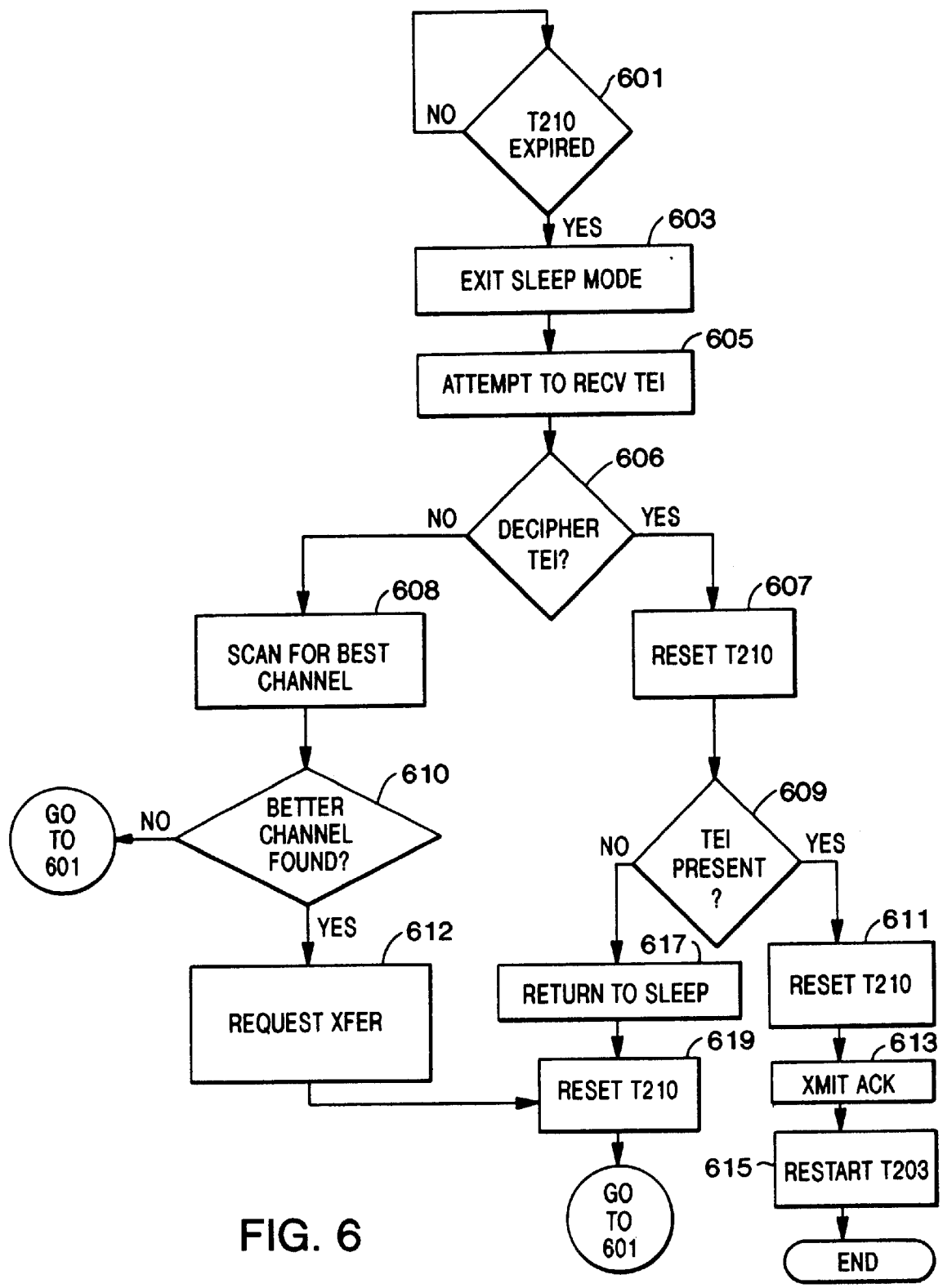
FIG. 6 is a high level flowchart of the procedure followed by the Mobile Unit.

FIG. 6 is a high level flowchart of the procedure followed by the Mobile Unit 401. Upon expiry of a counter (a "T210 Timer") with period N210 equal to N210 (STEP 601), the RRME 403 within the Mobile Unit 401 causes the Mobile Unit 401 to exit Sleep-Mode (STEP 603). The forward channel is then received in an attempt to detect a TEI-Notification message (STEP 605). In accordance with one embodiment of the present invention, if the Mobile Unit 401 is incapable of decoding the TEI-Notification message (STEP 606), then the Mobile Unit 401 scans the available forward channels in search of the forward channel that has the best signal quality (STEP 608). If such a channel is not found (STEP 610), then the Mobile Unit 401 again waits for the next TEI-Notification message to be sent (STEP 605). If another forward channel is found to be of higher quality, then the Mobile Unit 401 attempts to establish communications with the Base Station 411 transmitting that forward channel (STEP 612). The Mobile Unit 401 then waits for the TEI-Notification message interval and attempts once again to receive the TEI-Notification message on the new forward channel (605).

If the TEI-Notification message can be decoded, then the T210 Timer is then reset (STEP 607). If there is a TEI within the TEI-Notification list which matches the TEI of the receiving Mobile Unit 401 (STEP 609), then in accordance with one embodiment of the present invention the Mobile Unit 401 scans the available forward channels to determine whether the Mobile Unit 401 is still within the cell associated with the channel on which the TEI-Notification message was received (STEP 614). Upon determining which forward channel has the best signal quality, the Mobile Unit 401 transmits an acknowledgement to the IS through the Base Station 411 on the reverse channel associated with that forward channel (STEP 613). The acknowledgement indicates which Base Station the Mobile Unit has selected. The T203 Timer is then reset (STEP 615). If the TEI-Notification message does not include the TEI for the receiving Mobile Unit 401 (STEP 609), then the Mobile Unit 401 returns to Sleep-Mode (STEP 617), the N210 Timer is reset (STEP 619), and the Mobile Unit 401 waits again until the T210 Timer expires (STEP 601).

It should be clear from the above that the Mobile Unit 401 of the present invention scans the available forward channels in an attempt to perform a cell transfer only if: (1) the signal quality of the forward channel which the Mobile Unit 401 is attempting to receive is so poor that the Mobile Unit 401 is unable to decode the TEI-Notification message, or (2) the TEI-Notification message includes the TEI of that Mobile Unit 401. In accordance with one embodiment of the present invention, the Mobile Unit 401 always attempt to find the best forward channel upon receiving a TEI-Notification message including the TEI associated with that Mobile Unit 401. However, in an alternative embodiment, additional or alternative criteria (such as signal quality, amount of time since the last scan for a better channel, etc.) may be used to determine whether to scan for a better forward channel.

Summary

In accordance with the present invention, a Mobile Unit (Mobile Unit) 401 has a "Sleep-Mode" which allows the Mobile Unit 401 to conserve power. Each Mobile Unit 401 is "loosely" tracked by an Intermediate System (IS). The IS routes messages to be transmitted to a Mobile Unit 401 through the Base Station with which the Mobile Unit 401 is communicating. Since the IS knows with which Base Station 411 the Mobile Unit 409 is communicating, messages are routed through only that Base Station 411. Each Base Station 411 transmits a TEI-Notification message intended only for only those Mobile Units 401 with which that Base Station 411 is in communication. In accordance with the present invention, the Mobile Unit 401 may leave the particular cell serviced by a Base Station 411 without a cell transfer occurring until the Mobile Unit 401 losses the ability to accurately receive TEI-Notification messages from the Base Station 411, or the TEI assigned to the Mobile Unit appears within the TEI-Notification message received by the Mobile Unit 401. When a Mobile Unit 401 receives a TEI-Notification message which indicates that a message is pending for that Mobile Unit 401 (i.e., the TEI assigned to that Mobile Unit is listed within a list of TEIs in the TEI-Notification message), the Mobile Unit 401 determines whether the signal received from the Base Station 411 is below a predetermined threshold (i.e., the Mobile Unit 401 has left the cell). It will be understood that any means for communicating to the Mobile Unit 401 that there is a pending message may be used in accordance with the present invention. For example, the Base Station 411 may transmit a message that includes a code which is directed to more than one Mobile Unit, and which causes each of these Mobile Units to check whether a message is pending.

A number of embodiments of the present invention have been described. Nevertheless, it will be understood that various modifications may be made without departing from the spirit and scope of the invention. For example, in one alternative embodiment of the present invention, a sublist of channels that are likely candidates to be the best forward channel are scanned. If one of these forward channels has sufficiently high quality to support the airlink, then a cell transfer is performed by the Mobile Unit. Otherwise, additional forward channels are scanned until an appropriate forward channel is identified.

In another alternatively, other criteria may be used to determine whether to scan for another channel. For example, in accordance with one embodiment of the present invention, each of the available forward channels are scanned if the Mobile Unit 401 has not scanned the forward channels for more than a predetermined amount of time. In yet another alternative embodiment, the Mobile Unit always scans each of the available channels before transmitting. The determination as to which channel is best suited to support the airlink may be made based upon any one or more signal quality parameters. For example, weighted values assigned to RSSI, bit error rate (BER), block error rate (BLER), and/or signal to noise ratio (SNR) may be used alone or in any combination to detemine the channel best suited to supporting the airlink.

Accordingly, it is to be understood that the invention is not to be limited by the specific illustrated embodiment, but only by the scope of the appended claims.

We claim:

1. A low power mobile unit for receiving on a forward channel and transmitting on a reverse channel over a wireless cellular communication network, the low power mobile unit comprising;
    (a) a receiver for receiving over forward channels, the receiver for periodically receiving notification messages from a current forward channel and for periodically measuring signal quality of at least the current forward channel of the forward channels;
    (b) a transmitter for transmitting over reverse channels; and
    (c) a management entity coupled to the receiver and the transmitter, the management entity of the low sower mobile unit for:
        (1) periodically receiving notification messages from the receiver, the notification messages including client numbers client numbers having been received from a current, each such client number in the notification messages being associated with a mobile unit for which data is pending, the low power mobile unit determining if its client number is within the notification message;
        (2) periodically receiving from the receiver an indication of the signal quality of the current forward channel;
        (3) (i) periodically comparing the signal quality of the current forward channel with the signal quality of at least one other forward channel, (ii) periodically identifying a new forward channel having the highest signal quality, and (iii) if the receiver receives a notification message with the client number associated with the low power mobile unit or if the management entity determines that the signal quality of the current forward channel is below a minimum quality level, then providing the transmitter with a cell transfer message to be transmitted over a reverse channel associated with the new forward channel to change communication channels, otherwise, the management entity continuing to have the low power mobile unit communicate with the cellular network over the current forward channel.

2. A mobile unit, for use in a cellular communications network having a plurality of base stations, each base station being associated with a cell, the mobile unit comprising:
    a. a receiver for receiving over forward channels from a plurality of base stations and for periodically receiving notification messages over a forward channel;
    b. a management entity, coupled to the receiver, for:
        i. requesting that the receiver attempt to receive notification messages periodically at predetermined intervals from a particular base station, regardless of whether the mobile unit remains within the cell associated with that base station;
        ii. upon failing to successfully receive a notification message at a predetermined interval over the first selected forward channel, scanning for a forward channel being transmitted from a base station associated with the cell in which the mobile unit is located and attempting to receive the notification messages over a forward channel being transmitted from the base station;

iii. upon successfully receiving a notification message, determining whether a code associated with the mobile unit is encoded within the notification message and if so, acknowledging receipt of the code through the base station associated with the cell in which the mobile unit is currently located; and, wherein the mobile unit continues to receive notification messages from a particular base station after leaving the cell associated with that particular base station until the mobile unit is incapable of successfully receiving a notification message from that base station or until one of the notification messages includes the code associated with the mobile unit.

3. The mobile unit of claim 2, further including:

a. an idle timer; and b. a wake timer;

wherein the management entity and the receiver enter sleep mode upon expiry of the idle timer and awake to receive and process a notification message upon expiry of the wake timer, whereafter the management entity and receiver enter sleep mode once again if the notification message has been successfully received and does not include a code associated with the mobile unit.

4. The mobile unit of claim 2, wherein the management entity causes the mobile unit to scan for the best available forward channel upon initial application of power to the mobile unit.

5. The mobile unit of claim 2, wherein the mobile unit is assigned a unique code upon initial application of power to the mobile unit.

6. The mobile unit of claim 2, wherein the management entity requests the receiver to scan for a better forward channel in response to the quality of the channel dropping below a predetermined threshold.

7. The mobile unit of claim 2, wherein the management entity requests the receiver to scan for a better forward channel a predetermined amount of time after the last attempt to find a better forward channel.

8. The mobile unit of claim 2, wherein the management entity causes the mobile unit to enter a power conservation mode after each successful attempt to receive a notification message in which no code associated with the mobile unit was encoded.

9. The mobile unit of claim 8, further including a timer for indicating when the next notification message is to be received.

10. A method for communicating between a base station within a cellular communications system and a mobile unit, the method comprising:

scanning the available forward channels to determine in which cell a mobile unit initially is located;

establishing an airlink between the mobile unit and an initial base station associated with the cell in which the mobile unit is initially located; and attempting to receive messages from the initial base station after the mobile unit leaves the cell associated with the initial base station, unless:

i. the mobile unit is to respond to a received message; or ii. messages sent by the initial base station are no longer being successfully received within the mobile unit; and establishing an airlink between the mobile unit and the base station associated with the cell in which the mobile unit is currently located if;

i. the mobile unit is to respond to a received message from the initial base station; or ii. messages sent by the initial base station are no longer being successfully received within the mobile unit.

11. The method of claim 10, wherein if the mobile unit is to respond to the received message, then the step of establishing an airlink comprises:

scanning the available forward channels prior to responding to determine in which cell the mobile unit currently is located.

12. The method of claim 10, wherein if the messages being sent by the base station associated with the cell in which the mobile unit was initially located are no longer being successfully received, then the method further comprises:

scanning the available forward channels to determine in which cell the mobile unit currently is located; and transmitting the response to the base station associated with the cell in which the mobile unit is located.

13. The method of claim 10, further comprising the mobile unit scanning to establish an air link with the cell in which the mobile unit is currently located at predetermined intervals.

14. The method of claim 10, further comprising:

scanning for a forward channel which is being transmitted by a base station associated with the cell in which the mobile unit is currently located if the signal quality of the message signals falls below a predetermined threshold;

establishing an airlink to the base station which is associated with the cell in which the mobile unit is currently located over a current forward channel; and receiving notification messages over the current forward channel until:

i. the current forward channel signal quality falls below the predetermined threshold;

ii. the mobile unit leaves the cell associated with the base station which is transmitting the current forward channel and the notification messages can no longer be successfully received; or iii. the mobile unit leaves the cell associated with the base station which is transmitting the current forward channel and the notification message received requires a response.

15. A method of conserving power in a mobile paging unit operating in a cellular communication system, the method comprising:

a. providing the mobile paging unit, the mobile paging unit including a receiver, a transmitter, and a processor for controlling the receiver and the transmitter, b. resisting changing channels in the mobile unit from a current channel to another channel when moving from a first cell associated with the current channel to another cell associated with the another channel, resisting changing channels in the mobile unit in order to conserve power;

c. periodically deactivating the receiver and the transmitter of the mobile paging unit after a first predetermined period of time elapses with no communication by the mobile paging unit in a cell, periodically deactivating the receiver and the transmitter of the mobile pading unit in order to conserve power; and, d. periodically activating the receiver to receive a notification message after a second predetermined period of time elapses with the receiver and the transmitter being deactivated.

16. The method of claim 15 for conserving power in a mobile paging unit operating in a cellular communication system, the method further comprising:

if the notification message is not received after periodically activating the receiver to receive a notification message, scanning for the best forward channel of the current cell over which to receive the notification message; and selecting the best forward channel of the forward channels of the current cell and executing a cell transfer command to communicate within the cell using the best forward channel.

17. The method of claim 15 for conserving power in a mobile paging unit operating in a cellular communication system, the method further comprising:

if the notification message is received after periodically activating the receiver to receive a notification message and if the notification message has no code associated with the mobile paging unit therefore indicating that no messages are pending for the mobile paging unit, deactivating the receiver to conserve power.

18. The method of claim 15 for conserving power in a mobile paging unit operating in a cellular communication system, the method further comprising:

if the notification message is received after periodically activating the receiver to receive a notification message and if the notification message has a code associated with the mobile paging unit therefore indicating that messages are pending for the mobile paging unit, keeping the receiver activated to receive a message for the mobile paging unit and briefly activating the transmitter to transmit an acknowledgment signal indicating the message for the mobile paging unit was received.

\* \* \* \* \*